H. G. HARPER.
PISTON RING REMOVER.
APPLICATION FILED APR. 8, 1912.
1,054,347.
Patented Feb. 25, 1913.
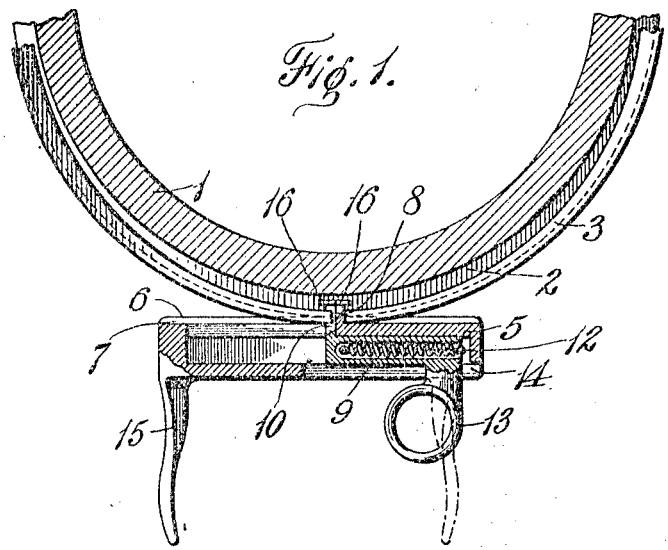
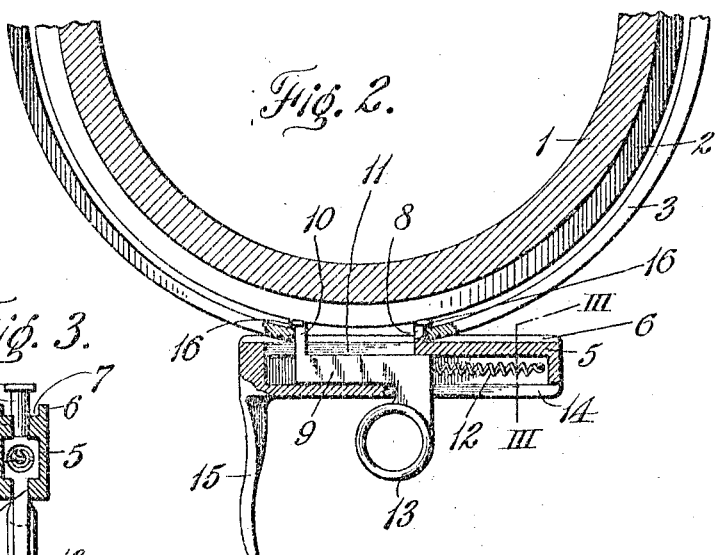
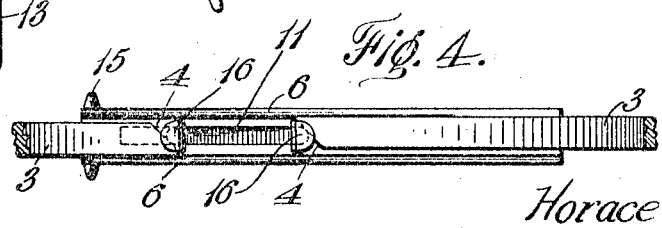
Witnesses
Chas. W. Stauffiger
Anna M. Dorr
Inventor
Horace G. Harper
By
Attorney

UNITED STATES PATENT OFFICE.

HORACE G. HARPER, OF DETROIT, MICHIGAN.

PISTON-RING REMOVER.

1,054,347.  Specification of Letters Patent.  Patented Feb. 25, 1913.

Application filed April 8, 1912. Serial No. 889,325.

*To all whom it may concern:*

Be it known that I, HORACE G. HARPER, a citizen of the United States of America, residing at Detroit, in the county of Wayne and State of Michigan, have invented certain new and useful Improvements in Piston-Ring Removers, of which the following is a specification, reference being had therein to the accompanying drawings.

This invention relates to a device for removing packing rings of pistons from their grooves and its object is to provide a simple tool which will operate to firmly clamp and hold the ends of the ring and spread the same apart to increase the diameter of the ring so that it may be readily removed from or inserted in its groove.

To this end the invention consists in the matters hereinafter set forth and more particularly pointed out in the claims reference being had to the accompanying drawing, in which—

Figure 1 is a sectional view of a device embodying the invention and showing the same in operative relation to a piston ring and in position to be operated to spread the ends of the ring apart; Fig. 2 is a similar view showing the device engaging and holding the ends of a ring spread apart; Fig. 3 is an enlarged transverse section of the device on the line III—III of Fig. 2; and Fig. 4 is an edge elevation of the device with a piston ring engaged and held thereby.

In the drawing 1 represents a section of a portion of a piston of any common construction having a groove 2 to receive a packing ring 3 which is made in the usual manner with abutting beveled or inclined ends 4.

The device for use in removing the packing ring 3, consists of a suitable hollow casing 5 having longitudinally extending ribs 6 along each angle of the inner edge or face of the casing which ribs form between them a groove 7 extending the length of the casing. This groove is preferably a very little wider than the width of the packing ring 3 to be removed, and midway between the ends of the groove is a stud 8 formed integral with the casing at the center of the groove. A rectangular slide 9 is movable and guided within the casing, and this slide is formed with a stud 10 which projects outward from the slide through a longitudinal slot 11 in the bottom of the groove 7. A coiled spring 12 within the casing normally holds the slide moved with its stud 10 in engagement with the stud 8 and a finger grip 13 on the slide extends outward through a slot 14 in the back of the casing so that the slide may be moved by the operator against the action of its spring. Upon the end of the casing opposite that in which the slot 14 is formed, is a handle 15 adapted to be grasped by the hand of the operator when the finger grip 13 is grasped to move the slide. As shown in dotted lines in Fig. 1, the finger grip 13 may be made in the form of a handle similar to the handle 15 instead of in the form of a ring finger grip.

The studs 8 and 10 are each formed semi-circular in cross section so that when in contact with each other they together form a round stud. Each stud is formed with a flange or head 16 at its extreme outer end to engage beneath the ends of the packing ring and hold said ends in the groove 7. When the studs are inserted between the inclined ends of the ring and the slide moved to spread the ends apart, each end of the ring by reason of the engagement of the rounded side of the stud with the inclined surface of the end of the ring, will be crowded toward one side of the groove 7 and wedged between the stud and the flange 6. The ends of the ring are thus locked and firmly held in the groove 7 of the casing by the studs and the ring may thus be expanded and handled by the device in placing it within its groove in the piston or in removing it therefrom.

Obviously, changes in the construction and arrangement of parts may be made without departing from the spirit of my invention and I do not wish to limit myself to the particular form or construction shown.

Having thus fully described my invention what I claim is:—

1. In a device of the character described, the combination of a member forming a guide to receive the ends of a split packing ring, and relatively movable members to engage the ends of the ring and spread the same apart.

2. In a device of the character described, the combination of a casing having a fixed stud to engage one end of a split packing ring, a movable member in the casing having a stud to engage the opposite end of said ring, and means for moving the movable member to spread the ends of the ring apart.

3. In a device of the character described, the combination of relatively movable members formed to project between the ends of a split packing ring and engage the inner and outer sides thereof adjacent to said ends, means for engaging the edges of the ring to prevent lateral movement of its ends when engaged by said members, and means for actuating said members relatively to spread the ends of the ring apart.

4. In a device of the character described, the combination of a member having a groove to receive the ends of a split packing ring, relatively movable members to engage between the said ends of the ring and having portions to engage the inner side of the ring and hold said ends in the groove, and means for moving said members relatively to spread the ends of the ring apart.

5. In a device of the character described, the combination of a casing having a groove in one edge, a fixed stud projecting from said groove, a second stud movable along said groove toward and from the fixed stud, and means for moving the movable studs.

6. In a device of the character described, the combination of a casing having a groove in one edge, a fixed stud projecting from said groove, a slide guided in said casing, a stud on said slide projecting into said groove, and a spring in the casing to move the slide in one direction.

7. In a device of the character described, the combination of a hollow casing having a groove in one edge and a slot in the bottom of said groove, a fixed stud on the casing within the groove at the end of the slot, a slide in the casing, a stud on the slide projecting through the slot, a spring in the casing to normally hold the slide moved with its stud adjacent to the fixed stud, and means for moving the slide.

8. In a device of the character described, the combination of a hollow casing having a groove in one edge and a slot in the bottom of the groove, a fixed stud on the casing in the groove at the end of the slot, a slide in the casing, a stud on the slide projecting through said slot, said studs being each formed semicircular in cross section and provided with flanges on their outer ends, a spring in the casing to move the slide, and means on the slide for moving the same.

In testimony whereof I affix my signature in presence of two witnesses.

HORACE G. HARPER.

Witnesses:
OTTO F. BARTHEL
ANNA M. DORR.